(12) United States Patent
Dods (10) Patent No.: US 10,291,748 B1
(45) Date of Patent: May 14, 2019

(54) APPARATUS, SYSTEM, AND METHOD FOR PREDICTIVELY FORWARDING UNKNOWN FLOWS

(71) Applicant: Juniper Networks, Inc., Sunnyvale, CA (US)

(72) Inventor: Craig Dods, Stittsville (CA)

(73) Assignee: Juniper Networks, Inc, Sunnyvale, CA (US)

( * ) Notice: Subject to any disclaimer, the term of this patent is extended or adjusted under 35 U.S.C. 154(b) by 108 days.

(21) Appl. No.: 15/335,384

(22) Filed: Oct. 26, 2016

(51) Int. Cl.
*H04L 12/28* (2006.01)
*H04L 29/06* (2006.01)
*H04L 12/801* (2013.01)

(52) U.S. Cl.
CPC ............. *H04L 69/16* (2013.01); *H04L 47/33* (2013.01); *H04L 69/22* (2013.01)

(58) Field of Classification Search
CPC .......... H04L 69/16; H04L 69/22; H04L 47/33
See application file for complete search history.

(56) References Cited

U.S. PATENT DOCUMENTS

8,363,654 B2   1/2013   Congdon

*Primary Examiner* — Bo Hui A Zhu
(74) *Attorney, Agent, or Firm* — FisherBroyles, LLP (57) ABSTRACT

The disclosed apparatus may include a storage device that stores a set of routes. In this example, the apparatus may also include a processing unit that is communicatively coupled to the storage device. This processing unit may (1) analyze an unknown flow of packets that are destined for a certain node, (2) identify at least one characteristic of the unknown flow based at least in part on the analysis, (3) determine, based at least in part on the characteristic, that the unknown flow of packets likely represents traffic that corresponds to a specific application, (4) predictively select, from the set of routes, a non-default route that facilitates transfer to the certain node in connection with the specific application, and then (5) forward a first packet of the unknown flow to the certain node by way of the non-default route. Various other apparatuses, systems, and methods are also disclosed.

16 Claims, 6 Drawing Sheets

APPARATUS, SYSTEM, AND METHOD FOR PREDICTIVELY FORWARDING UNKNOWN FLOWS

BACKGROUND

Networks often include nodes responsible for forwarding traffic to one another. For example, a network may include a node that establishes a communication session (such as a Transport Control Protocol (TCP) session) with another node. In this example, the node may send traffic in connection with the communication session to a router that is capable of forwarding the traffic to the other node by way of certain routes. In the event that the router is able to identify an application that is linked to the communication session in one way or another, the router may make certain forwarding decisions based at least in part on that application.

Such a communication session may sometimes be referred to as a flow. Unfortunately, in the event that the flow is unknown and/or the first of its kind, the router may be unable to identify and/or determine which application is linked to the flow until after receiving a certain number of packets in connection with the flow. As a result, the router may resort to forwarding the packets of that unknown flow along a default route, thereby potentially leading to high-cost routing and/or poor performance.

The instant disclosure, therefore, identifies and addresses a need for additional and improved systems and methods for predictively forwarding unknown flows.

SUMMARY

As will be described in greater detail below, the instant disclosure generally relates to apparatuses, systems, and methods for predictively forwarding unknown flows. In one example, an apparatus for accomplishing such a task may include a storage device that stores a set of routes that define network paths to nodes within a network. In this example, the apparatus may also include a processing unit that is communicatively coupled to the storage device. This processing unit may (1) analyze an unknown flow of packets that are destined for a certain node within the network, (2) identify at least one characteristic of the unknown flow of packets based at least in part on the analysis, (3) determine, based at least in part on the characteristic of the unknown flow of packets, that the unknown flow of packets likely represents traffic that corresponds to a specific application, (4) predictively select, from the set of routes stored in the storage device, a non-default route that facilitates transfer to the certain node within the network in connection with the specific application, and then (5) forward a first packet of the unknown flow to the certain node within the network by way of the predictively selected non-default route.

Similarly, a router incorporating the above-described apparatus may include a storage device that stores a set of routes that define network paths to nodes within a network. In this example, the router may also include a processing unit that is communicatively coupled to the storage device. This processing unit may (1) analyze an unknown flow of packets that are destined for a certain node within the network, (2) identify at least one characteristic of the unknown flow of packets based at least in part on the analysis, (3) determine, based at least in part on the characteristic of the unknown flow of packets, that the unknown flow of packets likely represents traffic that corresponds to a specific application, (4) predictively select, from the set of routes stored in the storage device, a non-default route that facilitates transfer to the certain node within the network in connection with the specific application, and then (5) forward a first packet of the unknown flow to the certain node within the network by way of the predictively selected non-default route.

A corresponding method may include (1) analyzing an unknown flow of packets that are destined for a certain node within a network, (2) identifying at least one characteristic of the unknown flow of packets based at least in part on the analysis, (3) determining, based at least in part on the characteristic of the unknown flow of packets, that the unknown flow of packets likely represents traffic that corresponds to a specific application, (4) predictively selecting, from the set of routes stored in the storage device, a non-default route that facilitates transfer to the certain node within the network in connection with the specific application, and then (5) forwarding a first packet of the unknown flow to the certain node within the network by way of the predictively selected non-default route.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for predictively forwarding unknown flows. As will be explained in greater detail below, embodiments of the instant disclosure may pre-populate an application cache with certain routes based at least in part on certain indicators of future forwarding decisions. Such indicators may include and/or be derived from machine learning, probabilistic forwarding algorithms, and/or past computing behavior of certain users or nodes within a network. By pre-populating the specific application cache in this way, embodiments of the instant disclosure may be able to link those routes to certain types of traffic or certain traffic characteristics.

Accordingly, upon detecting an unknown flow, embodiments of the instant disclosure may identify one or more characteristics of the unknown flow and then predictively select a non-default route (sometimes also referred to as a specific route) from the application cache based at least in part on those characteristics. In doing so, these embodiments may be able to avoid forwarding packets of the unknown flow along a default route, thereby potentially reducing the routing costs and/or increasing performance.

The term "flow," as used herein, generally refers to any communication session that includes, involves, and/or facilitates the exchange of traffic between computing devices. The term "unknown flow," as used herein, generally refers to a first instance of a specific flow relative to a computing device responsible for forwarding and/or facilitating the exchange of traffic between computing devices in a communication session. In some examples, an unknown flow may occur and/or represent the first time that one node attempts to establish a communication session with another node in connection with a specific application and/or in a certain environmental context.

Figure 1:
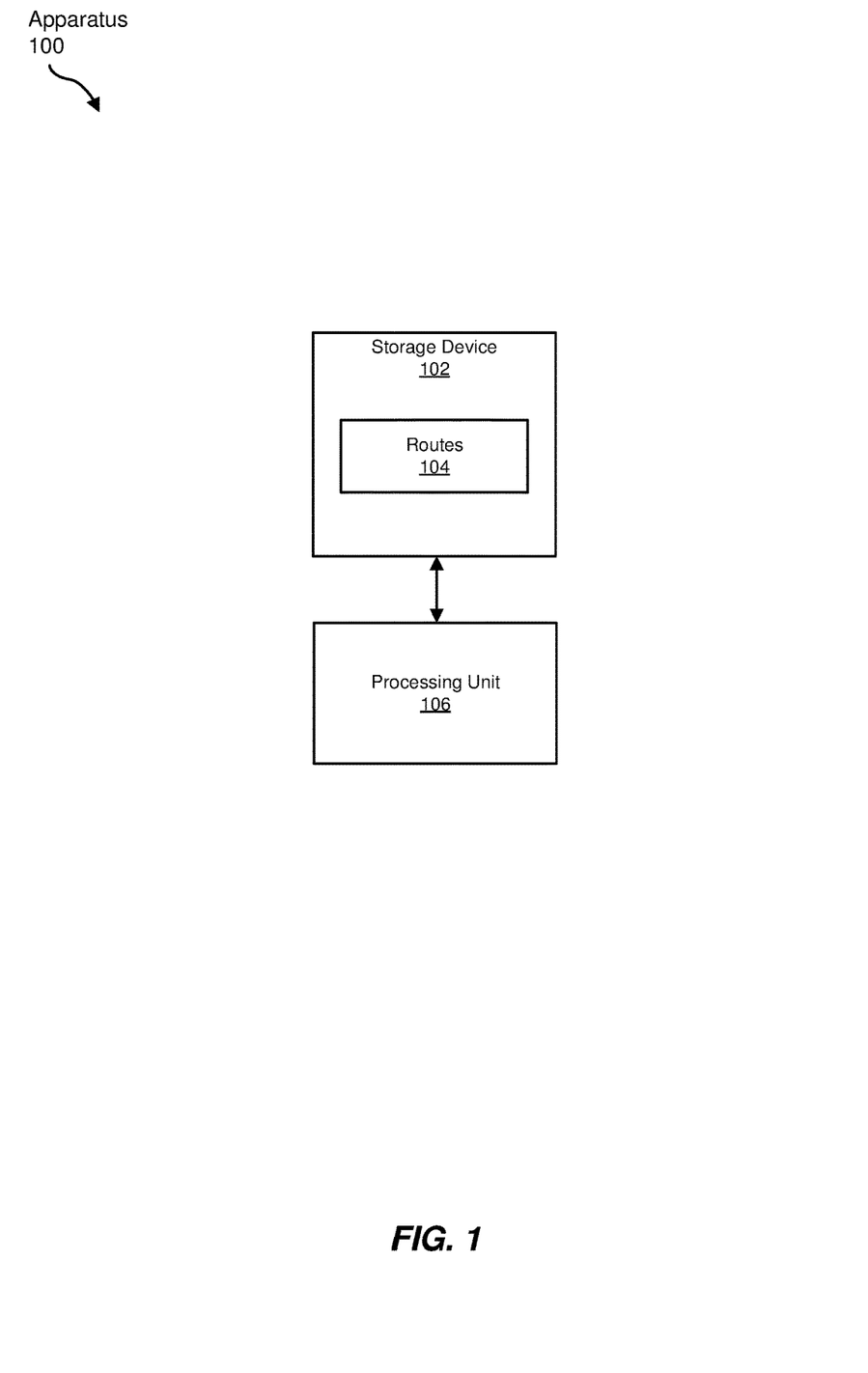
FIG. 1 is a block diagram of an exemplary apparatus for predictively forwarding unknown flows.
Figure 2:
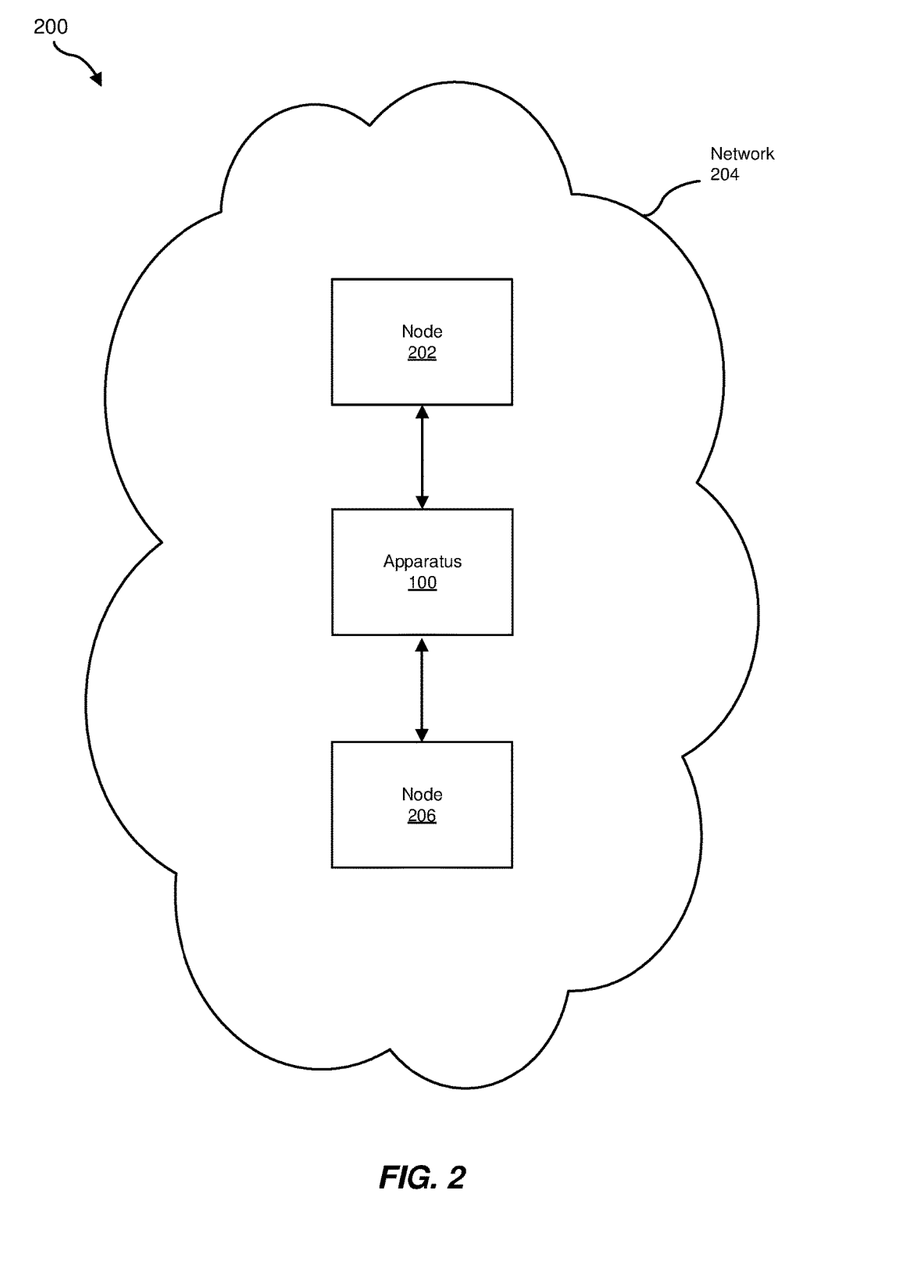
FIG. 2 is a block diagram of an exemplary implementation of an apparatus for predictively forwarding unknown flows.
Figure 3:
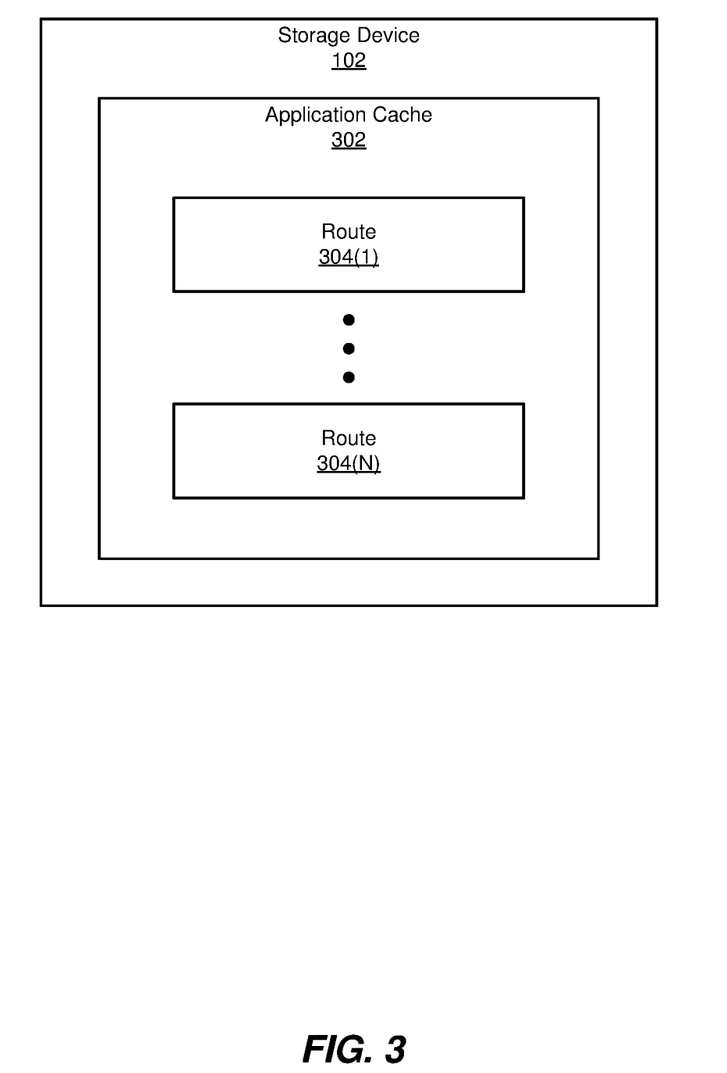
FIG. 3 is a block diagram of an exemplary application cache for storing routes that have been linked to certain applications in one way or another.

The following will provide, with reference to FIGS. 1-3, examples of apparatuses and corresponding implementations that facilitate predictively forwarding unknown flows. The discussion corresponding to FIG. 4 will provide a detailed description of exemplary route metadata that identifies certain characteristics of a route stored in an application cache. The discussion corresponding to FIG. 5 will provide a detailed description of an exemplary method for predictively forwarding unknown flows. Finally, the discussion corresponding to FIG. 6 will provide numerous examples of systems that may include the components shown in FIGS. 1, 2, and 3.

FIG. 1 shows an exemplary apparatus 100 for predictively forwarding unknown flows. Examples of apparatus 100 include, without limitation, network devices, routers, switches, hubs, modems, bridges, repeaters, gateways, load balancers, multiplexers, network adapters, servers, client devices, portions of one or more of the same, variations or combinations of one or more of the same, and/or any other suitable apparatus.

As illustrated in FIG. 1, apparatus 100 may include a storage device 102 and a processing unit 106. Storage device 102 generally represents any type or form of volatile or non-volatile memory or storage medium capable of storing data and/or computer-readable instructions. In one example, storage device 102 may store, load, and/or maintain routes 104. Examples of storage device 102 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable storage device.

Routes 104 each generally represent any type or form of information, data, and/or representation that indicates and/or identifies a path within a network and/or across networks. The term "path," as used herein, generally refers to any series of links and/or devices that facilitate communication and/or the flow of traffic between a source and a destination within a network and/or across networks.

Processing unit 106 generally represents any type or form of hardware-implemented processor capable of interpreting and/or executing computer-readable instructions. In one example, processing unit 106 may access, add, remove, and/or modify routes 104 stored in storage device 106. Examples of processing unit 106 include, without limitation, physical processors, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable processing unit.

Apparatus 100 in FIG. 1 may be implemented in a variety of ways and/or contexts. As a specific example, FIG. 2 shows a block diagram of an exemplary implementation 200 that includes apparatus 100 for predictively forwarding unknown flows. As illustrated in FIG. 2, implementation 200 may include a network 204 that consists of multiple computing devices. For example, network 204 may include and/or represent a node 202, a node 206, and/or apparatus 100. In this example, nodes 202 and 206 may be able to exchange communications with one another via apparatus 100. Network 204 may include other network devices (not necessarily illustrated in FIG. 2) that sit between nodes 202 and 206 and/or are included in the path that links node 202 with node 206.

Nodes 202 and 206 each generally represent any type or form of computing device capable of reading computer-executable instructions. In one example, computing devices 202 and 206 may each include and/or represent a physical network device (such as a router, switch, and/or gateway). Additional examples of nodes 202 and 206 include, without limitation, client devices, computing devices, servers, laptops, tablets, desktops, storage devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable nodes.

Network 204 generally represents any medium or architecture capable of facilitating communication or data transfer. In one example, network 204 may facilitate communication between computing devices 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, network 204 may also include and/or represent various other computing devices in addition to computing devices 202 and 206 and apparatus 100.

In some examples, processing unit 106 of apparatus 100 may analyze an unknown flow of packets that are destined for a certain node within a network. For example, node 202 may initiate an unknown flow of packets and then send the same to apparatus 100. In this example, apparatus 100 may receive the unknown flow of packets from node 202. The unknown flow of packets may be destined for node 206.

In one example, processing unit 106 may identify and/or analyze the unknown flow of packets. For example, processing unit 106 may perform Deep Packet Inspection (DPI) on one or more of the packets. As part of this DPI, processing unit 106 may identify and/or examine a Secure Sockets Layer (SSL) header of at least one of the packets of the unknown flow. Additionally or alternatively, processing unit 106 may export certain results of the DPI to storage device 102 or another computing device for future reference, correlation, and/or use in connection with predictively forwarding unknown flows.

In one example, processing unit 106 may identify certain characteristics of the unknown flow of packets based at least in part on the analysis. For example, processing unit 106 may identify node 202 as the source of the unknown flow of packets, the name of the user operating node 202, a timestamp included in the unknown flow of packets, the Internet Protocol (IP) address of the source node, and/or the IP address of the destination node.

In one example, processing unit 106 may determine that the unknown flow of packets likely represents traffic that corresponds to a specific application based at least in part on the characteristics of the unknown flow. Processing unit 106 may populate an application cache with one or more non-default routes that each define a network path to a node that is linked in one way or another to the specific application to which the flow corresponds. Processing unit 106 may also correlate those non-default routes with certain metadata that identifies and/or describes the characteristics of the flow. In this way, processing unit 106 may pre-populate the application cache to facilitate making future forwarding decisions in connection with unknown flows. Such forwarding decisions may involve and/or rely on machine learning, probabilistic forwarding algorithms, and/or past computing behavior of certain users or nodes.

As a specific example, node 202 may perform a backup operation at 2:00 AM on a Monday by way of backup software. As part of this backup operation, node 202 may initiate a flow of packets and send the same to apparatus 100. This flow of packets may be destined for node 206.

Continuing with this example, apparatus 100 may receive and/or collect several packets of this flow from node 202. Processing unit 106 may analyze and/or examine the collected packets of the flow via DPI. In one example, processing unit 106 may make certain forwarding decisions based at least in part on the identity of an application involved in the flow of packets. However, in the event that the flow is new and/or unknown, processing unit 106 may be unable to determine the identity of the application until after receiving and examining six or so packets. As a result, processing unit 106 may resort to forwarding the first six or so packets of this flow along with all of the subsequent packets to node 206 by way of a default route. Processing unit 106 may refrain from switching from the default route to a proper non-default route in the middle of a flow due to complications that are likely to arise from such a switch.

In one example, after having received and examined six or so packets, processing unit 106 may be able to determine that the flow of packets is linked to the backup software. In other words, processing unit 106 may be able to determine that the backup software directed node 202 to generate and/or send the packets. Additionally or alternatively, processing unit 106 may be able to determine that the node to which the flow is destined belongs to and/or is operated by the backup software company.

In one example, processing unit 106 may populate an application cache 302 in FIG. 3 included on storage device 102 in FIG. 3 with non-default routes 304(1)-(N) in FIG. 3. In this example, route 304(1) may define a path to node 206 within network 204. Processing unit 106 may associate and/or link route 304(1) to the backup software by generating route metadata 400 in FIG. 4 that identifies certain characteristics of the flow that was linked to the backup software and forwarded to node 206 by way of the default route.

Figure 4:
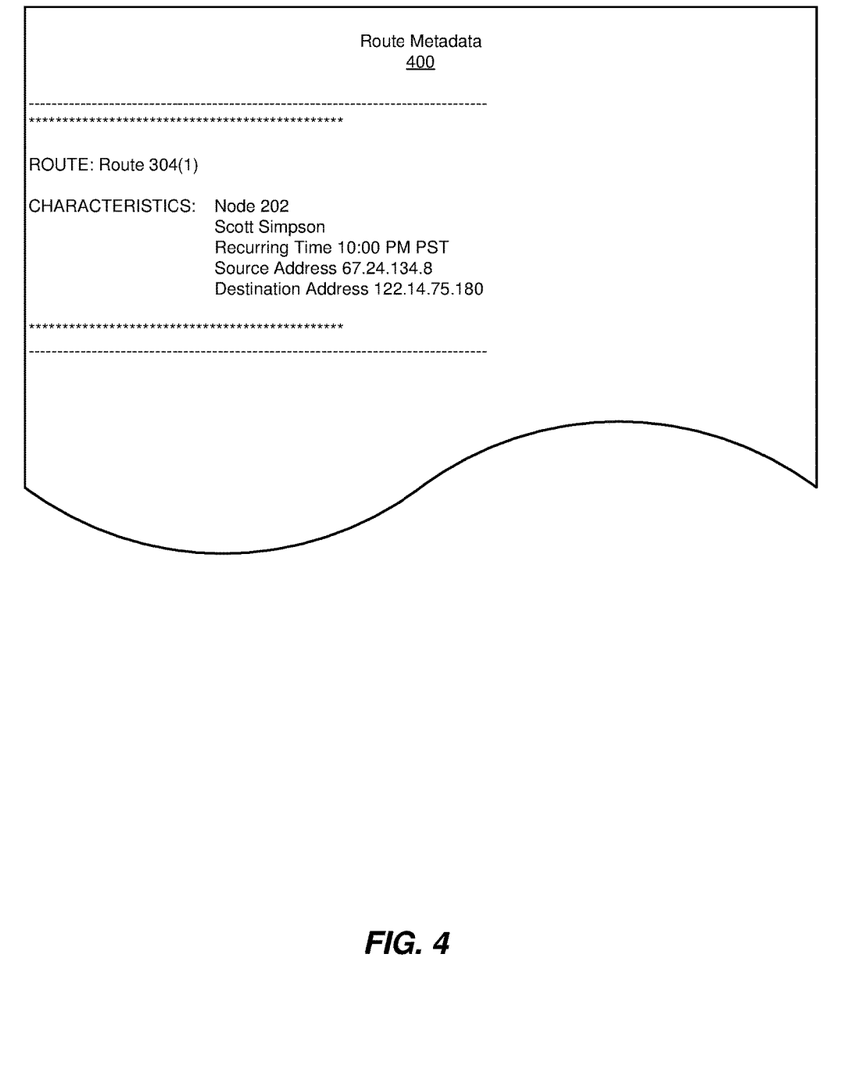
FIG. 4 is an illustration of exemplary route metadata that identifies certain characteristics of a route stored in an application cache.

As a specific example, route metadata 400 in FIG. 4 may identify route 304(1) as applying to the flow that originated from node 202, the identity of node 202, the user operating node 202 (in this example, "Scott Simpson"), the time at which the backup operation commenced (in this example, "2:00 AM PST"), the IP address of the device from which the flow originated (in this example, "67.24.134.8"), the IP address of the device to which the flow was destined (in this example, "122.14.75.180"), and/or the application linked to the flow or the type of application linked to the flow (in this example, "Backup Software").

On the following Monday, node 202 may perform another backup operation at 2:00 AM by way of backup software. As part of this backup operation, node 202 may initiate a flow of packets and send the same to apparatus 100. This flow of packets may also be destined for node 206. However, in some examples, one or more of the characteristics of this flow may differ from those of the flow from the previous Monday. For example, the source IP address may have changed, and/or a different user may be logged into node 202 at the time that this other backup operation commenced. Accordingly, this subsequent flow of packets may be considered a first instance, new, and/or unknown.

Continuing with this example, as the first packet of this flow arrives at apparatus 100, processing unit 106 may analyze the first packet and then identify certain characteristics of this flow of packets based at least in part on the analysis. For example, processing unit 106 may determine that this flow of packets originated from node 202 at 2:00 AM on a Monday. Processing unit 106 may then search application cache 302 for a route that has been associated with earlier traffic that had similar or identical characteristics. During this search, processing unit 106 may identify route 304(1) as being associated with such traffic. In other words, processing unit 106 may determine that this flow of packets likely represents traffic that corresponds to and/or originates from the same application as the earlier traffic that had similar or identical characteristics.

As a result, processing unit 106 may predict and/or assume that route 304(1) will direct the first packet of this flow to the correct destination. Processing unit 106 may thus predictively select route 304(1) for the first packet and corresponding flow and then forward the first packet and/or subsequent packets of this flow to node 206 by way of the path defined by route 304(1). In doing so, processing unit 106 may be able to forward these packets of the flow to node 206 via a predictively selected non-default route even though this flow is new and/or unknown, thereby potentially improving routing costs and/or performance over traditional technologies.

An unknown flow of packets may be predictively matched to a non-default route pre-populated in the application cache in a number of different ways. For example, processing unit 106 may apply various machine learning techniques, rely on past behavior of the source or destination node and/or their users, and/or implement certain probabilistic algorithms to match an unknown flow to a non-default route in application cache 302. In this example, processing unit 106 may identify, within application cache 302, a non-default route that corresponds to an unknown flow by matching one or more of the flow's characteristics to route metadata (e.g., route metadata 400 in FIG. 4) collected in connection with earlier traffic handled and/or forwarded by apparatus 100.

In some examples, processing unit 106 may identify route 304(1) in application cache 302 as defining a path to a certain node associated with a specific application based at least in part on an identity of a user who initiated the unknown flow of packets, a history of the user's computing behavior, an identity or IP address of a node on which the user initiated the unknown flow of packets, a history of the node's computing activity, a time of day that the unknown flow of packets is initiated at the node, and/or an IP address of the certain node for which the unknown flow of packets are destined. Accordingly, processing unit 106 may be able to predictively select route 304(1) to facilitate transfer of the unknown flow of packets to the correct destination despite not yet having affirmatively and/or conclusively identified, at that time, the specific application to which the unknown flow corresponds.

In some examples, processing unit 106 may identify route 304(1) in application cache 302 as defining a path to a certain node associated with a specific application based at least in part on a tuple that includes the IP address of the source node, the source port number, the IP address of the destination node, the destination port number, and/or a representation of the communication protocol of the unknown flow. Accordingly, processing unit 106 may be able to predicatively select route 304(1) for transferring the unknown flow of packets to the correct destination despite not yet having affirmatively and/or conclusively identified, at that time, the specific application to which the unknown flow corresponds.

As a specific example, apparatus 100 may facilitate the transfer of traffic for multiple Internet Service Providers (ISPs). In this example, one ISP link may carry high-quality, low-latency signals for voice and/or audio data over a T3 circuit channel represented by a specific route. Another ISP link may carry low-quality, low-priority signals over a low-cost communication channel represented by a default route.

Continuing with this example, in the event that a user initiates a Voice Over IP (VOIP) call handled by apparatus 100, processing unit 106 may be able to route and/or forward the corresponding voice and/or audio traffic by way of the specific route instead of the default route. In doing so, the integrity of the users' voices may be maintained even if this is the first time that the caller has initiated such a call to that particular recipient. In other words, processing unit 106 may predictively select a specific route that leads to the correct node associated with that VOIP application based at least in part on certain knowledge and/or information. For example, processing unit 106 may know that the caller tends to make telephone calls at 30 minute intervals during business hours. As a result, processing unit 106 may know that any traffic generated within a couple minutes of those intervals is likely a VOIP call.

Additionally or alternatively, processing unit 106 may know that the destination node used by the recipient is a VOIP endpoint device. Processing unit 106 may also know that the source or destination port number has historically been linked to VOIP calls. Processing unit 106 may further know that the corresponding communication protocol has historically been linked to VOIP calls.

As another example, apparatus 100 may implement and/or represent a data center firewall that performs load-balancing between different server pools. In this example, processing unit 106 may use probability to predict that route 304(N) facilitates transfer of an unknown flow to the correct destination. In other words, processing unit 106 may implement and/or select the most likely "best path" for an arbitrary flow based at least in part on a tuple. This tuple may include and/or represent the IP address of the source node, the source port number, the IP address of the destination node, the destination port number, and/or the communication protocol of the arbitrary flow.

Figure 5:
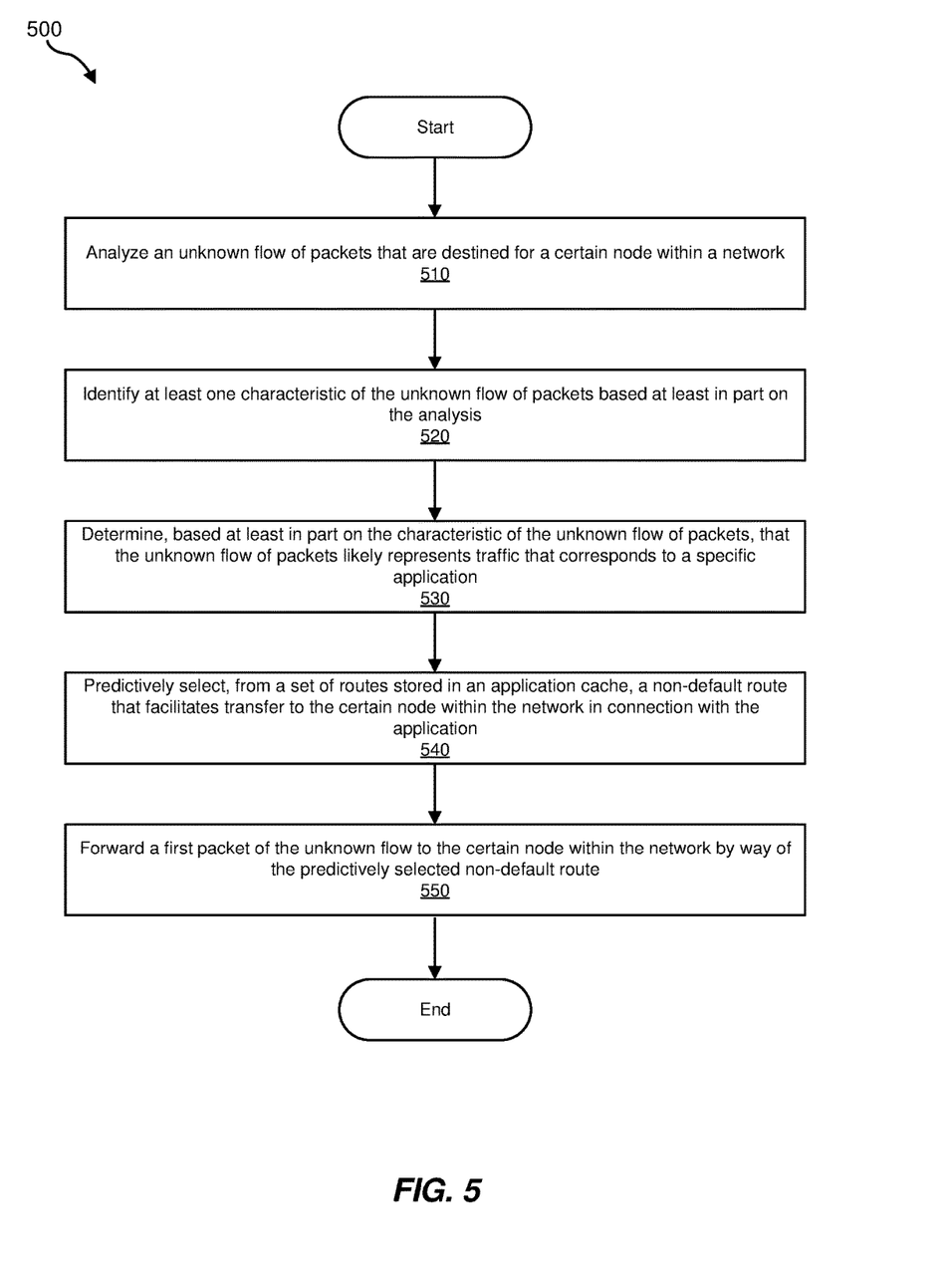
FIG. 5 is a flow diagram of an exemplary method for predictively forwarding unknown flows.

FIG. 5 is a flow diagram of an exemplary method 500 for predictively forwarding unknown flows. Method 500 may include the step of analyzing an unknown flow of packets that are destined for a certain node within a network (510). This analyzing step may be performed in a variety of ways. In one example, the step may be performed via DPI. For example, processing unit 106 may detect and/or receive an unknown flow of packets at apparatus 100. As the unknown flow of packets arrives at apparatus 100, processing unit 106 may analyze the unknown flow by performing DPI on one or more of the packets.

In some examples, method 500 may also include the step of identifying at least one characteristic of the unknown flow of packets based at least in part on the analysis (520). This identifying step may be performed in a variety of ways. In one example, the step may rely on the results of the DPI analysis. For example, during the DPI analysis, processing unit 106 may identify the user who initiated the unknown flow of packets, a history of the user's computing behavior, the IP address of the source node, a history of the source node's computing activity, the time of day that the unknown flow of packets is initiated at the source node, and/or the IP address of the destination node.

In some examples, method 500 may further include the step of determining, based at least in part on the characteristic of the unknown flow of packets, that the unknown flow of packets likely represents traffic that corresponds to a specific application (530). This determining step may be performed in a variety of ways. In one example, the step may be performed by matching the characteristics of the unknown flow of packets to metadata of the corresponding route, which is pre-populated in the application cache. For example, processing unit 106 may search application cache 302 for a route whose metadata matches one or more of the characteristics of the unknown flow. During this search, processing unit 106 may determine that the metadata of route 304(1) matches multiple characteristics of the unknown flow. Processing unit 106 may then determine that the unknown flow likely represents traffic that corresponds to the same application as route 304(1).

Additionally or alternatively, method 500 may also include the step of predictively selecting, from a set of routes stored in an application cache, a non-default route that facilitates transfer to the certain node within the network in connection with the specific application (540). This predictive selecting step may be performed in a variety of ways. In one example, the step may be performed by identifying the route whose metadata matches the characteristics of the unknown flow. For example, processing unit 106 may identify route 304(1) as leading to the correct destination due at least in part to the metadata or route 304(1) matching the characteristics of the unknown flow. Processing unit 106 may then select route 304(1) for forwarding the packets of the unknown flow to node 206.

Finally, method 500 may include the step of forwarding a first packet of the unknown flow to the certain node within the network by way of the predictively selected non-default route (550). This forwarding step may be performed in a variety of ways. In one example, the step may be performed by sending the unknown flow to the correct destination node via the predictively selected non-default route. For example, processing unit 106 may send the first packet of the unknown flow to the next hop identified by the predictively selected non-default route. In turn, that next hop may forward the first packet of the unknown flow further along the path to the destination node. This process may continue until the first packet reaches the destination node.

Figure 6:
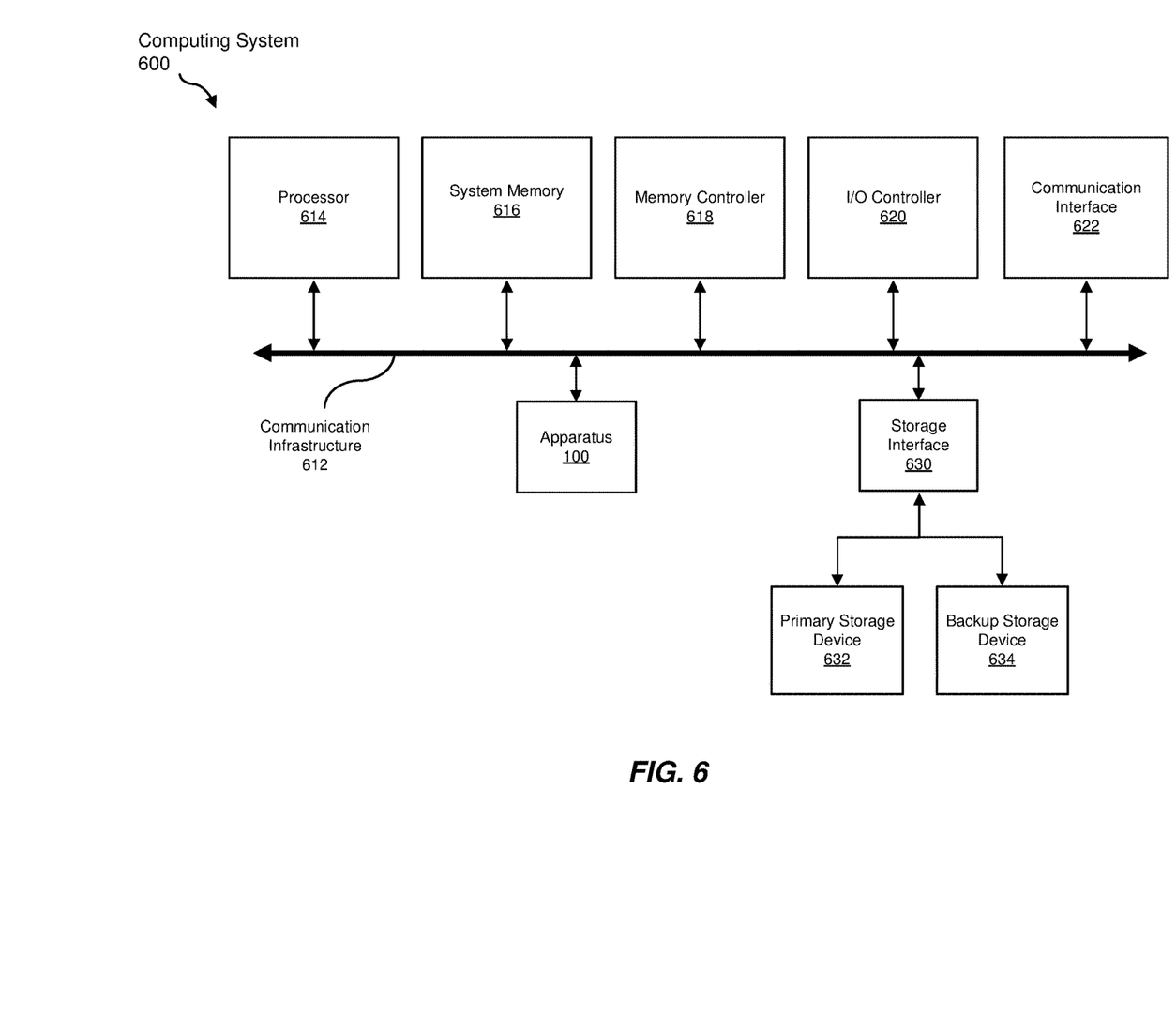
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), load balancers, network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a storage device that stores a set of routes that define network paths from a node within a network to additional nodes within the network; and
   a processing unit communicatively coupled to the storage device at the node, wherein the processing unit:
      pre-populates an application cache with at least some of the routes based at least in part on certain indicators of future forwarding decisions;
      analyzes an unknown flow of packets that are destined for one of the additional nodes within the network, wherein the unknown flow of packets comprises a first instance of a specific flow relative to the node;
      identifies at least one characteristic of the unknown flow of packets based at least in part on the analysis;
      determines, based at least in part on the characteristic of the unknown flow of packets, that the unknown flow of packets likely represents traffic that corresponds to a specific software application that generated the unknown flow of packets;
      predictively selects, from the routes pre-populated in the application cache, a non-default route that facilitates transfer to the additional node within the network in connection with the specific software application that generated the unknown flow of packets, wherein predictively selecting the non-default route comprises:
         identifying the non-default route as being used to forward earlier traffic that occurred at the same time of day as the unknown flow;
         determining that the identified non-default route defines a network path to the additional node;
         determining that the additional node is associated with the specific software application;
         determining, based at least in part on the non-default route having been used to forward earlier traffic that occurred at the same time of day as the unknown flow, that the unknown flow likely represents traffic that corresponds to the specific software application; and
         predictively selecting the non-default route within the pre-populated application cache due at least in part to the non-default route having been used to forward earlier traffic that occurred at the same time of day as the unknown flow; and
      forwards a first packet of the unknown flow to the additional node within the network by way of the predictively selected non-default route.

2. The apparatus of claim 1, wherein:
   the processing unit receives the unknown flow of packets from another node within the network; and
   the unknown flow of packets occurs the first time that the other node attempts to establish a communication session with the additional node in connection with the specific software application.

3. The apparatus of claim 1, wherein the processing unit determines that the unknown flow of packets likely represents traffic that corresponds to the specific software application by:
   performing Deep Packet Inspection (DPI) on the unknown flow of packets; and
   identifying the specific software application to which the unknown flow corresponds based at least in part on the DPI performed on the unknown flow of packets.

4. The apparatus of claim 3, wherein the processing unit:
   examines a Secure Sockets Layer (SSL) header of at least one packet of the unknown flow; and
   determines the specific software application to which the unknown flow corresponds based at least in part on the examination of the SSL header of the packet.

5. The apparatus of claim 1, wherein the characteristic of the unknown flow of packets comprises at least one of:
   an identity of a user who initiated the unknown flow of packets;
   a history of the user's computing behavior;
   an identity of a node on which the user initiated the unknown flow of packets;
   a history of the node's computing activity;
   a time of day that the unknown flow of packets is initiated at the node; and
   an Internet Protocol (IP) address of the additional node for which the unknown flow of packets are destined.

6. The apparatus of claim 1, wherein the certain indicators of future forwarding decisions comprise at least one of:
   machine learning;
   past behavior of one or more of the additional nodes within the network; and
   a probabilistic forwarding algorithm.

7. The apparatus of claim 1, wherein the processing unit:
   identifies a route within the pre-populated application cache that was used to forward earlier traffic that exhibited the same characteristic as the unknown flow;
   determines that the identified route defines a network path to the additional node;
   determines that the additional node is associated with the specific software application;
   determines, based at least in part on the route having been used to forward earlier traffic that exhibited the same characteristic as the unknown flow, that the unknown flow likely represents traffic that corresponds to the specific software application; and
   predictively selects the route within the pre-populated application cache due at least in part to the route having been used to forward earlier traffic that exhibited the same characteristic as the unknown flow.

8. The apparatus of claim 1, wherein the characteristic of the unknown flow of packets comprises a tuple that includes:
   a source IP address; a source port number;
   a destination port number;
   a communication protocol of the unknown flow; and
   a destination IP address.

9. A router comprising:
   a storage device that stores a set of routes that define network paths from the router to nodes within a network; and
   a processing unit communicatively coupled to the storage device at the router, wherein the processing unit:
      pre-populates an application cache with at least some of the routes based at least in part on certain indicators of future forwarding decisions;

analyzes an unknown flow of packets that are destined for one of the nodes within the network, wherein the unknown flow of packets comprises a first instance of a specific flow relative to the router;

identifies at least one characteristic of the unknown flow of packets based at least in part on the analysis;

determines, based at least in part on the characteristic of the unknown flow of packets, that the unknown flow of packets likely represents traffic that corresponds to a specific software application that generated the unknown flow of packets;

predictively selects, from the routes pre-populated in the application cache, a non-default route that facilitates transfer to the additional node within the network in connection with the specific software application that generated the unknown flow of packets, wherein predictively selecting the non-default route comprises:

identifying the non-default route as being used to forward earlier traffic that occurred at the same time of day as the unknown flow;

determining that the identified non-default route defines a network path to the additional node;

determining that the additional node is associated with the specific software application;

determining, based at least in part on the non-default route having been used to forward earlier traffic that occurred at the same time of day as the unknown flow, that the unknown flow likely represents traffic that corresponds to the specific software application; and predictively selecting the non-default route within the pre-populated application cache due at least in part to the non-default route having been used to forward earlier traffic that occurred at the same time of day as the unknown flow; and forwards a first packet of the unknown flow to the node within the network by way of the predictively selected non-default route.

10. The router of claim 9, wherein:
the processing unit receives the unknown flow of packets from another node within the network; and
the unknown flow of packets occurs the first time that the other node attempts to establish a communication session with the node in connection with the specific software application.

11. The router of claim 9, wherein the processing unit determines that the unknown flow of packets likely represents traffic that corresponds to the specific software application by:
performing Deep Packet Inspection (DPI) on the unknown flow of packets; and
identifying the specific software application to which the unknown flow corresponds based at least in part on the DPI performed on the unknown flow of packets.

12. The router of claim 11, wherein the processing unit:
examines a Secure Sockets Layer (SSL) header of at least one packet of the unknown flow; and
determines the specific software application to which the unknown flow corresponds based at least in part on the examination of the SSL header of the packet.

13. The router of claim 9, wherein the characteristic of the unknown flow of packets comprises at least one of:
an identity of a user who initiated the unknown flow of packets;
a history of the user's computing behavior;
an identity of a node on which the user initiated the unknown flow of packets;
a history of the node's computing activity;
a time of day that the unknown flow of packets is initiated at the node; and
an Internet Protocol (IP) address of the node for which the unknown flow of packets are destined.

14. The router of claim 9, wherein the certain indicators of future forwarding decisions comprise at least one of:
machine learning;
past behavior of one or more of the nodes within the network; and
a probabilistic forwarding algorithm.

15. The router of claim 9, wherein the processing unit:
identifies a route within the pre-populated application cache that was used to forward earlier traffic that exhibited the same characteristic as the unknown flow;
determines that the identified route defines a network path to the node;
determines that the node is associated with the specific software application;
determines, based at least in part on the route having been used to forward earlier traffic that exhibited the same characteristic as the unknown flow, that the unknown flow likely represents traffic that corresponds to the specific software application; and
predictively selects the route within the pre-populated application cache due at least in part to the route having been used to forward earlier traffic that exhibited the same characteristic as the unknown flow.

16. A method comprising:
pre-populating, based at least in part on certain indicators of future forwarding decisions, an application cache with a set of routes that define network paths from a node within a network to additional nodes within the network;
analyzing an unknown flow of packets that are destined for a certain node within a network, wherein the unknown flow of packets comprises a first instance of a specific flow relative to the node;
identifying at least one characteristic of the unknown flow of packets based at least in part on the analysis;
determining, based at least in part on the characteristic of the unknown flow of packets, that the unknown flow of packets likely represents traffic that corresponds to a specific software application that generated the unknown flow of packets;
predictively selecting, from the routes pre-populated in the application cache, a non-default route that facilitates transfer to the additional node within the network in connection with the specific software application that generated the unknown flow of packets, wherein predictively selecting the non-default route comprises:
identifying the non-default route as being used to forward earlier traffic that occurred at the same time of day as the unknown flow;
determining that the identified non-default route defines a network path to the additional node;
determining that the additional node is associated with the specific software application;
determining, based at least in part on the non-default route having been used to forward earlier traffic that occurred at the same time of day as the unknown flow, that the unknown flow likely represents traffic that corresponds to the specific software application; and predictively selecting the non-default route within the pre-populated application cache due at least in part to the non-default route having been used to forward earlier traffic that occurred at the same time of day as the unknown flow; and forwarding a first packet of the unknown flow to the certain node within the network by way of the predictively selected non-default route.

* * * * *